United States Patent
Stumpf et al.

(10) Patent No.: US 9,322,077 B2
(45) Date of Patent: Apr. 26, 2016

(54) METHOD FOR OBTAINING METALS AND RARE EARTH METALS FROM SCRAP

(75) Inventors: Thomas Stumpf, Bad Harzburg (DE); Leonhard Baumann, Aldersbach (DE); Roland Möller, Bad Harzburg (DE)

(73) Assignee: ECOLOOP GMBH, Goslar (DE)

( * ) Notice: Subject to any disclaimer, the term of this patent is extended or adjusted under 35 U.S.C. 154(b) by 225 days.

(21) Appl. No.: 14/115,729

(22) PCT Filed: May 3, 2012

(86) PCT No.: PCT/EP2012/001893
§ 371 (c)(1),
(2), (4) Date: Dec. 18, 2013

(87) PCT Pub. No.: WO2012/152408
PCT Pub. Date: Nov. 15, 2012

(65) Prior Publication Data
US 2014/0090518 A1    Apr. 3, 2014

(30) Foreign Application Priority Data

May 10, 2011    (DE) .......................... 10 2011 100 995

(51) Int. Cl.
*C22B 5/10*    (2006.01)
*C22B 5/12*    (2006.01)
(Continued)

(52) U.S. Cl.
CPC ... *C22B 5/00* (2013.01); *C10J 3/20* (2013.01); *C10K 1/007* (2013.01); *C10K 1/024* (2013.01); *C22B 5/10* (2013.01); *C22B 5/12* (2013.01); *C22B 5/14* (2013.01); *C22B 7/001* (2013.01);
(Continued)

(58) Field of Classification Search
CPC .............. C22B 5/10; C22B 5/12; C22B 5/14; C10K 1/024; C10K 1/007
See application file for complete search history.

(56) References Cited

U.S. PATENT DOCUMENTS

| 6,568,612 B1 | 5/2003 | Aoki et al. |
| 2010/0132257 A1* | 6/2010 | Agrawal et al. .................. 48/85 |

FOREIGN PATENT DOCUMENTS

| DE | 43 17 145 | 4/1994 |
| DE | 195 36 383 | 4/1997 |

(Continued)

OTHER PUBLICATIONS

International Search Report for PCT/EP2012/001893 dated Aug. 23, 2012.

*Primary Examiner* — George Wyszomierski
*Assistant Examiner* — Tima M McGuthry Banks
(74) *Attorney, Agent, or Firm* — Stephen J. Weyer, Esq.; Stites & Harbison, PLLC.

(57) ABSTRACT

The method is used to obtain metals, noble metals, and rare earth metals from scrap. The aim of the invention is to provide a method that allows an efficient recovery even from electronic scrap. This is achieved in that the scrap and carbon-containing materials (A) are oxidized with oxygen containing gases (11) in the presence of alkaline materials under overall reducing conditions with an overall lambda of <1 in an updraft gasifier (2) with a bulk material moving bed, said gasifier having a reduction zone (13) and an oxidation zone (7). The resulting syngas is drawn at the upper part (16) of the updraft gasifier, and the metals, noble metals, and rare earth metals are bound at least partly to the alkaline materials as oxides and/or in elementary form. Finally, said metals are obtained from the process as an enriched mixture (B) by means of physical separation methods.

23 Claims, 3 Drawing Sheets

(51) Int. Cl.

| | | |
|---|---|---|
| *C22B 5/14* | (2006.01) | |
| *C10K 1/02* | (2006.01) | |
| *C22B 5/00* | (2006.01) | |
| *C22B 7/00* | (2006.01) | |
| *C22B 7/02* | (2006.01) | |
| *C22B 11/02* | (2006.01) | |
| *C22B 59/00* | (2006.01) | |
| *C10J 3/20* | (2006.01) | |
| *C10K 1/00* | (2006.01) | |

(52) U.S. Cl.
   CPC ............... *C22B 7/02* (2013.01); *C22B 11/025* (2013.01); *C22B 59/00* (2013.01); *C10J 2300/0906* (2013.01); *C10J 2300/0946* (2013.01); *C10J 2300/0996* (2013.01); *Y02P 10/214* (2015.11)

(56) References Cited

FOREIGN PATENT DOCUMENTS

| | | |
|---|---|---|
| DE | 196 42 161 | 4/1998 |
| DE | 19726105 | 12/1998 |
| DE | 10 2004 029658 | 1/2006 |
| EP | 0 107 131 | 5/1984 |

\* cited by examiner

Figure 2

| A | B | C | D | E |
|---|---|---|---|---|
| Metal | Density (g/cm²) | Tmp (°C) | Tbp (°C) | Standard Potential[3] (V) |
| Mercury | 13,55 | -38 | 356 | 0,79 |
| Gallium | 5,904 | 29 | 2204 | -0,53 |
| Indium | 7,31 | 156 | 2072 | -0,34 |
| Tin | 7,31 | 231 | 2602 | -0,14 |
| Polonium[1] | 9,2 | 254 | 962 | 0,80 |
| Bismuth[1] | 9,78 | 271 | 1564 | 0,32 |
| Thallium | 11,85 | 304 | 1473 | -0,34 |
| Cadmium | 8,65 | 321 | 767 | -0,40 |
| Lead | 11,34 | 325 | 1749 | -0,13 |
| Zinc | 7,14 | 419 | 907 | -0,76 |
| Cerium[2] | 6,689 | 795 | 3360 | -2,48 |
| Ytterbium[2] | 6,965 | 824 | 1196 | -2,23 |
| Europium[2] | 5,244 | 826 | 1527 | -2,41 |
| Lanthanum[2] | 6,146 | 920 | 3470 | -2,52 |
| Praseodymium[2] | 6,64 | 935 | 3290 | -2,46 |
| Silver[1] | 10,49 | 961 | 2162 | 0,80 |
| Neodymium[2] | 6,8 | 1024 | 3100 | -2,43 |
| Gold[1] | 19,32 | 1064 | 2856 | 1,52 |
| Samarium | 7,353 | 1072 | 1803 | -2,41 |
| Copper[1] | 8,92 | 1084 | 2927 | 0,34 |
| Prometheum[2] | 7,264 | 1100 | 3000 | -2,42 |
| Uranium | 18,97 | 1133 | 3930 | -1,49 |
| Manganese | 7,47 | 1246 | 2061 | -1,18 |
| Gadolinium[2] | 7,901 | 1312 | 3250 | -2,40 |
| Terbium[2] | 8,219 | 1356 | 3230 | -2,39 |
| Dysprosium[2] | 8,551 | 1407 | 2567 | -2,35 |
| Nickel | 8,908 | 1455 | 2730 | -0,26 |

Figure 2 (continued)

| A | B | C | D | E |
|---|---|---|---|---|
| Metal | Density (g/cm²) | Tmp (°C) | Tbp (°C) | Standard Potential[3] (V) |
| Holmium[2] | 8,8 | 1461 | 2720 | 2,32 |
| Cobalt | 8,9 | 1495 | 2927 | -0,28 |
| Erbium[2] | 9,05 | 1529 | 2868 | -2,30 |
| Iron | 7,874 | 1538 | 2861 | -0,41 |
| Thulium[2] | 9,321 | 1545 | 1950 | -2,28 |
| Palladium[1] | 12,023 | 1555 | 2963 | 0,99 |
| Lutetium[2] | 9,841 | 1652 | 3402 | -2,26 |
| Thorium | 11,72 | 1755 | 4788 | -1,83 |
| Platinum[1] | 21,45 | 1768 | 3825 | 1,12 |
| Zirconium | 6,511 | 1857 | 4409 | -1,43 |
| Chromium | 7,14 | 1907 | 2671 | -0,74 |
| Vanadium | 6,11 | 1910 | 3407 | -1,19 |
| Rhodium[1] | 12,45 | 1964 | 3695 | 0,60 |
| Technetium[1] | 11,5 | 2157 | 4265 | 0,27 |
| Hafnium | 13,31 | 2233 | 4603 | -1,57 |
| Ruthenium | 12,37 | 2334 | 4150 | 0,38 |
| Iridium[1] | 22,56 | 2466 | 4428 | 0,92 |
| Niobium | 8,57 | 2477 | 4744 | -1,10 |
| Molybdenum | 10,28 | 2623 | 4639 | -0,20 |
| Tantalum | 16,65 | 3017 | 5458 | -0,81 |
| Osmium[1] | 22,59 | 3130 | 5000 | 0,69 |
| Rhenium[1] | 21,03 | 3186 | 5596 | -0,26 |
| Tungsten | 19,25 | 3423 | 5555 | -0,12 |

[1] Noble metals

[2] Rare earth metals

[3] Acid solution, potential compared to standard hydrogen electrode

METHOD FOR OBTAINING METALS AND RARE EARTH METALS FROM SCRAP

The present invention relates to obtaining metals, noble metals and rare earth metals from scrap.

Metals, noble metals, and in particular rare earth metals are used in numerous key technologies.

Given the sometimes limited ranges of their natural occurrence, the rare earth metals occupy a special position, especially in highly innovative key technologies. In new technology applications in particular, they are elemental raw material. The metal europium is needed in cathode ray tube screens for the red component in the RGB color space. Rare earths cause magnetized iron to maintain its magnetic effect. These neodymium magnets are used as permanent magnets in permanent-magnet-excited electric motors and are built into wind farm generators and into the electric motor part of hybrid motor vehicle engines. The element lanthanum, in turn, is needed for alloys in batteries. 13 percent of the rare earth metals are used for polishing agents. About 12 percent are used for special types of glass, and 8 percent are used for lighting plasma and LCD screens, for energy-saving lamps, and for radar equipment. Hence their consumption, which was 124,000 metric tons in 2009, is expected to be 189,000 metric tons in 2012. Moreover, rare earths are used in diagnostic radiology in medicine as well, as an additive to contrast agents in MRI examinations (magnetic resonance tomography).

In its "Raw Materials Initiative", the European Commission classifies rare earth metals as "critical metals". The working group of the Commission says they are especially important in terms of their use, but rare in terms of their availability. In addition, their occurrence in the world is limited to only a very few regions, so that even geopolitical aspects might play a decisive role in their long-term availability. Europe, for instance, has no commercially accessible deposits. At this time, the EU states are covering about 90% of their demand for rare earths through imports from China. The prices of individual rare earth metals have increased more than 10 times in the past 10 years.

When rare earths are broken down in mining, very large amounts of residues, which contain toxic wastes, are produced. They are usually stored in artificial ponds, surrounded by a dam. Moreover, most rare earth deposits contain radioactive materials, which have intrinsic risks such as the escape of radioactivity into the air or water.

For all these reasons, recycling methods for returning such substances to commercial circulation are gaining increasing importance.

In this respect, old electronic devices or electronic scrap produced in producing such devices are of particular interest. The waste streams of such devices contain considerable quantities of valuable metals, noble metals and rare earth metals. Electronic scrap is still a largely unused source of raw materials, but it contains valuable elements in far higher concentrations than is typically the case in the ores found in natural deposits.

Isolating the individual mms from electronic scrap is quite difficult. This is due among other things to the fact that the electronic components are soldered onto printed circuit boards, which in turn are made of plastics as well as additives, such as flame retardants that contain bromine. Despite its significant calorific value, it is therefore very difficult to make thermal use of electronic scrap.

Nevertheless, methods such as that proposed in German patent disclosure DE 102004029658 have made it their object first to burn the plastic ingredients contained, and then to isolate the metals from the ashes by chemical and physical separation methods. However, it is disadvantageous that the flue gases produced are very rich in pollutants, such as hydrogen bromide, hydrogen chloride and hydrogen fluoride and heavy metals, and therefore must be cleaned extremely carefully. The same is true for dioxins and furans, which occur in considerable quantities in the flue gases on account of the typically high copper contents in the electronic scrap and the catalytic action of copper.

Other methods have made it their object to utilize the plastic component in electronic scrap by gasification, forming synthesis gas. One such method is described in German patent disclosure DE 19536383 A1, for example. However, it has the disadvantage that again, hydrogen bromide and heavy metals get into the synthesis gas produced.

In the prior art, separation methods which treat the electronic scrap via physical and sometimes also chemical separation methods and divide them into individual substance streams have become established. Such methods are described for instance in DE 10031260 B4 and in DE 19726105 A1. However, a disadvantage of such methods is the high expense for equipment and the unsatisfactory separation precision of the individual separation stages as well as the inadequate degrees of enrichment of the valuable metals. Combining the methods with acid treatment, in turn, creates considerable additional environmental problems.

For the invention, the object has therefore become furnishing a method which allows efficient utilization even of electronic scrap, possibly using the parts that contain plastic, by means of energy-efficient conversion into synthesis gas.

According to the invention, the object is attained in that in a countercurrent gasifier having a moving bulk-material bed, which has a reduction zone and an oxidation zone, the carbon-containing materials are oxidized with oxygen-containing gases in the presence of alkaline substances under overall reductive conditions at a total lambda of less than 1; the resultant synthesis gas is drawn off at the top part of the countercurrent gasifier, and the metals, noble metals and rare earth metals are at least partially bound as oxides and/or in elemental form to the alkaline substances, whereupon they are obtained from the process as an enriched mixture by physical separation methods.

The invention offers the advantage that first, the carbon-containing components that are always present in electronic scrap can be utilized for furnishing the energy which in the final analysis is also necessary for obtaining the metals. At the same time, pollutants, such as bromine or hydrogen bromide and chlorine or hydrogen chloride, are effectively bound by the alkaline substances, so that the possibility that toxic dioxins and furans will form can be precluded. It is therefore unnecessary to make a special selection from among the discarded scrap.

As already mentioned, the carbon-containing material and the scrap can be electronic scrap and/or entire outdated electronic devices, such as cell phones or computers. Specifically, the method of the invention offers the advantage that the devices can be taken for recycling entirely as is, and need not first be separated into groups of materials. The carbon-containing components, such as plastic housings or the like, then serve as energy carriers for the course of the process, while the metal components are recovered.

Moreover, it can be advantageous also to add cable residues and/or other metal-containing dusts or solids to the carbon-containing material and scrap, in order to further increase the proportion of usable metal in the bulk material. For instance, these added materials can be ashes from combustion processes, or oil shale or other naturally occurring carbon-containing substances that contain metal.

As the alkaline substances, metal oxides, metal carbonates and metal hydroxides or mixtures of two or three of these substances are used, and they are metered purposefully into the countercurrent gasifier and/or into the gas phase above the reduction zone, and/or admixed with the carbon-containing materials before entry into the vertical processing chamber. These substances have proven especially effective for the course of the method, and preferably, these metal salts should contain elements of the alkali metals or elements of the alkaline earth metals and especially preferably calcium as a cation.

In a preferred refinement of the method, the alkaline substances are used at least partially in fine-granular form with a particle size of less than 2 mm as a solid and/or as a suspension in water. The fine-granular embodiment is suitable so that metals with a low melting point, below the temperatures present in the oxidation zone, can adhere in liquid form to the fine-granular metal oxide and be transported downward in the countercurrent gasifier.

To improve the flowability of the bulk material and/or its gas permeability, it can be expedient also to add coarse material to the moving bulk-material bed; as the coarse material, mineral substances and/or other inorganic substances or mixtures of substances having a particle size of 2 mm to 300 mm are used, as can wood and/or other biogenic materials of a similar size. In the case of wood or biogenic materials, the coarse material simultaneously serves as an energy carrier for the method. It is understood that before entry into the vertical processing chamber, additional carbon carriers are mixed in, in order to increase the concentration of usable carbon-containing components in the moving bulk-material bed and in order, as much as possible, to supply the energy needed by the method through external additions, rather than by burner lances or the like in the oxidation zone.

The overall reductive conditions of the method are preferably at a total lambda of less than 0.7 over all the stages of the processing chamber, and preferably 0.5 or less. The reductive conditions promote the binding of pollutants in the desired manner.

Preferably, the temperature in the reduction zone is up to 1500° C., so that the metals and rare earth metals, which are present in the form of oxides and as elements have a standard potential in an acid solution of less than 0 volts compared to the standard hydrogen electrode, are reduced at least partially into elemental metals by means of the carbon that is present and the carbon monoxide that is contained in the synthesis gas. This course of the method offers the advantage that the elemental metals can be generated directly in the method, and need not, after being enriched in the discharged materials, be subjected to separate physical separation processes.

In a further preferred feature of the method, it is provided that the reduced metals and rare earth metals as well as the metals, noble metals or rare earth metals already present at the outset as elements in the carbon-containing materials at least partially reach their melting point in the reduction zone and are at least partially fixed as molten droplets on the moving bulk-material bed and are transported onward in the countercurrent gasifier into the oxidation zone. In this way, the elements to be obtained undergo concentration in the moving bulk-material bed, until the use of the physical separation methods becomes practical.

A further embodiment of the method provides that the metals reduced in the reduction zone and the metals, noble metals or rare earth metals already present in elemental form at the outset of the process, if they have normal potentials in an acid solution of less than 1 volt compared to the standard hydrogen electrode, are converted at least partially in the oxidation zone, at temperatures of up to 1800° C. and at a lambda of greater than 1 prevailing locally in the oxidation zone, into oxides which are enriched in the proportion of fine-granular mineral substances, and as a result a mixture of fine-granular alkaline substances, for the most part metals and rare earth metals in oxide form, and noble metals in elemental form, is generated. This embodiment, too, can be expedient so that the elements to be obtained in the course of the recycling can be separated after having been concentrated.

In a further embodiment of the invention, it can be provided that the mixture comprising fine-granular alkaline substances, metals and rare earth metals in oxide form, and noble metals in elemental form is partially discharged with the moving bulk-material bed at the lower end of the countercurrent gasifier and partly discharged via the synthesis gas from the upper end of the countercurrent gasifier.

For example, the mixture comprising fine-granular mineral substances, metals and rare earth metals in oxide form, and noble metals in elemental form which is discharged at the lower end of the countercurrent gasifier together with the moving bulk-material bed can be separated, as a mixture of fine material from the coarse-particulate bulk material, by screening. In the case of discharge via the synthesis gas, it is preferred that the mixture comprising fine-granular mineral substances, metals and rare earth metals in oxide form, and noble metals in elemental form be carried together with the synthesis gas via a physical solids separator and separated out as filter dust.

Regardless of how they are obtained, the fine material mixture and/or the filter dust is preferably partially returned to the moving bulk-material bed, and as a result of this partial recirculation, a further enrichment of the metals and rare earth metals in oxide form and noble metals in elemental form is achieved. As already mentioned, the enrichment can later increase the efficiency of separating the metals in pure form.

It is preferably also provided that all the carbon-containing materials introduced into the process and the carbon carriers purposefully metered in are adjusted in their total metered quantity in the moving bulk-material bed such that sufficient carbon for the reduction reactions in the reduction zone as well as sufficiently oxidizable carbon in the oxidation zone for the energy input into the countercurrent gasifier are available.

The quantity of oxygen-containing gas introduced should preferably be dimensioned such that sufficient oxygen for complete oxidation of the pyrolysis coke residues present in the oxidation zone and as applicable, residues of further carbon carriers and oxidizable metals, rare earth metals and noble metals in elemental form, are available.

An especially preferred embodiment of the method is one in which in the vertical processing chamber and/or in the gas phase of the gaseous reaction products drawn off, in the presence of water vapor and calcium oxide and/or calcium carbonate and/or calcium hydroxide, a calcium-catalyzed reformation of substantial proportions of the resultant of the oil- and/or tar-containing cleavage products, which have a chain length of greater than C4, into carbon monoxide, carbon dioxide and hydrogen is performed at temperatures of more than 400°. The catalytic action of the calcium compounds ensures a considerably more favorable course of the overall method.

Preferably, the water vapor is purposefully metered into the vertical processing chamber and/or into the gas phase above the reduction zone, and/or is furnished in situ from the residual moisture of the materials used.

FIG. 1 shows one exemplary embodiment of the method of the invention. It is intended to explain the method, but not to limit it.

The materials containing carbon and metal, preferably streams (A) of electronic scrap material, are comminuted by mechanical comminution (1) to a particle size of less than 30 cm and delivered from above, via a vertical chute, to a countercurrent gasifier (2) which is embodied as a vertical processing chamber. They form a moving bulk-material bed. For later binding of the metals, noble metals and rare earth metals contained in the electronic scrap, alkaline substances (3), preferably fine-granular calcium oxide, are admixed with the electronic scrap before it enters the countercurrent gasifier (2).

Depending on the quality and physical nature of the electronic scrap, it may be advantageous for this coarse material (4), with a particle size of 2 mm to 300 mm, to be mixed in before the entry into the countercurrent gasifier (2) as well. This is especially appropriate if the rheology or the gas permeability of the moving bulk-material bed needs to be improved.

Still other carbon carriers (5) can be mixed into the moving bulk-material bed as well, to increase the proportion of usable carbon in the bulk material. For this, in addition to wood and biogenic substances, many carbon carriers, of extremely different kinds, can be employed.

The mixture of electronic scrap, alkaline substances, coarse material and possibly other carbon carriers flows through the vertical processing chamber (2) from top to bottom by gravity. The countercurrent gasifier has burner lances (6) in its middle region, which ensure constant-load firing in the vertical processing chamber and steady development of an oxidation zone (7). These burner lances can be fueled with fossil fuels (8) and oxygen-containing gas (9). As an alternative to fossil fuels, synthesis gas from the countercurrent gasifier (10) can also be used.

At the lower end of the vertical processing chamber, oxygen-containing gas (11) is introduced. This gas serves initially to cool the bulk material in a cooling zone (12) before it leaves the vertical processing chamber. In that process, the oxygen-containing gas is preheated as it flows farther upward in the vertical processing chamber. On the countercurrent gasification principle, the oxygen from the oxygen-containing gas reacts with the carbon-containing materials in the bulk material by oxidation, and the quantity of oxygen-containing gas is adjusted such that in the vertical processing chamber, a total lambda of preferably less than 0.5 is established. As a result, first an oxidation zone (7) develops, in which the residues of the carbon-containing material react with oxygen, forming $CO_2$. Higher up in the processing chamber, the oxygen decreases further, so that finally, still higher up, all the oxygen is depleted, and a reduction zone (13) develops under completely reductive conditions.

Conversely, if one considers the flow of bulk material mixture comprising electronic scrap, alkaline substances, coarse material, and possibly other carbon carriers from top to bottom, what takes place in the reduction zone (13) initially is drying of the possibly moist materials used, up to a characteristic temperature of 100° C. After that, the characteristic temperature of the materials rises further, so that the process of gasification of plastics (such as printed circuit boards) typically contained in the electronic scrap begins, and at a characteristic temperature of up to 500° C., the formation of methane, hydrogen and CO begins. After extensive degassing, the characteristic temperature of the materials increases still further because of the hot gases rising from the oxidation zone (7), so that finally, the electronic scrap is fully degassed and now comprises only residual coke, so-called pyrolysis coke, and metals, noble metals, rare earth metals, and ash components. The pyrolysis coke and any other carbon carriers present are transported farther downward with the bulk material in the vertical processing chamber, where they are partly converted, along with the $CO_2$ components from the oxidation zone (7), into CO by Boudouard conversion at temperatures above 800° C. in the reduction zone (13). Some of the pyrolysis coke and any further carbon carriers present also react in this zone, by the water-gas reaction, with water vapor which is likewise contained in the hot gases, forming CO and hydrogen. Up to this phase of the process, the metals contained, and especially the rare earth metals, are present in the moving bulk-material bed partially in the form of oxides.

FIG. 2, column A, shows various metals and column E shows their standard potentials in an acid solution, compared to the standard hydrogen electrode, using volts as the unit.

BRIEF DESCRIPTION OF THE DRAWINGS

FIG. 2 is a table listing various metals with respective density, (column b), melting point (column c), boiling point (column d) and standard potential (column e).

Figure 1:
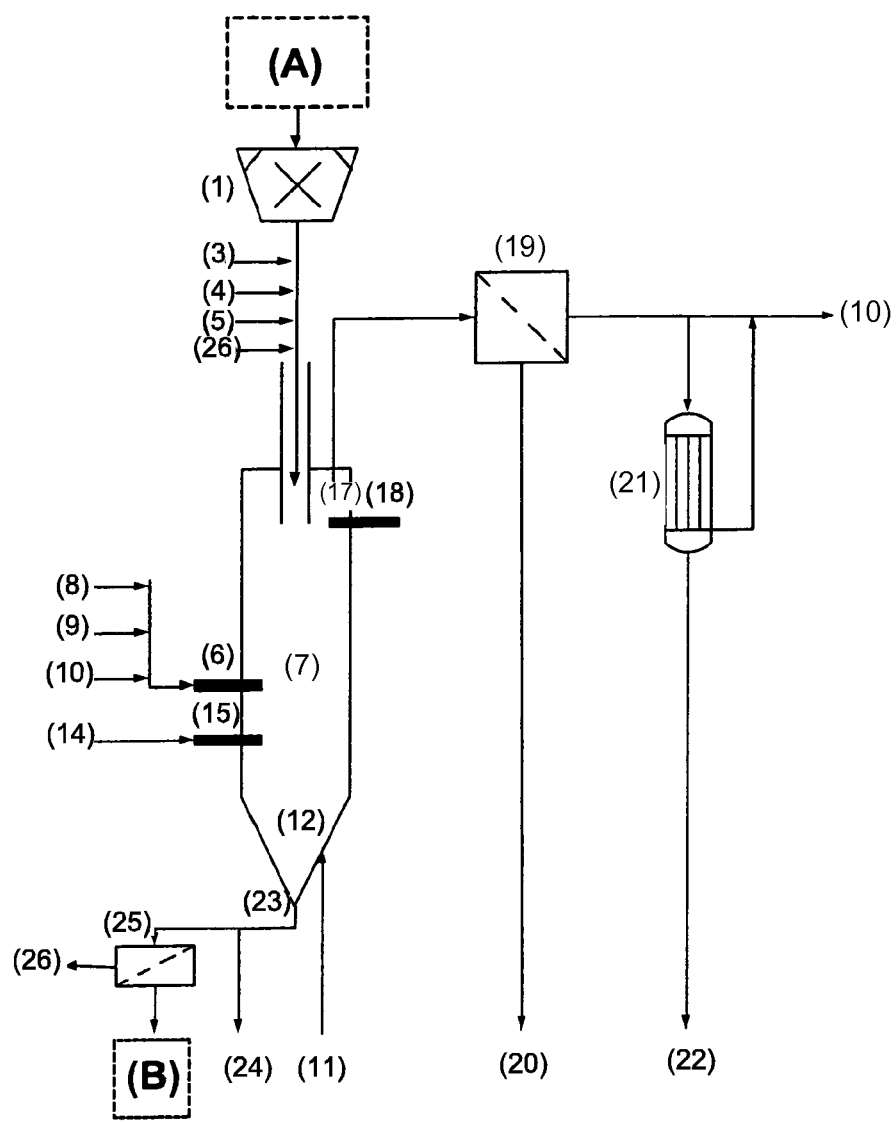
FIG. 1 is a flow chart showing one exemplary embodiment of a method in accordance with the present invention.

In the reduction zone (13) at temperatures of up to 1500° C., metals which are present as oxides in the electronic scrap and have a standard potential of less than 0 volts are at least partially reduced by means of the carbon present and are converted into elemental metals.

FIG. 2, column C, shows the melting points of the various metals present in elemental form.

Metals that are present in the reduction zone as elemental metals, either from the very outset or by reduction, and that have a melting point of less than 1500°, are converted at least partially into molten droplets, which in liquid form adhere to the fine-granular CaO and for the most part are transported farther downward in the countercurrent gasifier along with the moving bulk-material bed. The same is true for metals, or metal oxides, that are present with a coarse enough particle size, which largely prevents their discharge via the gas phase because of the inadequate fluidizability.

Along with residues of the pyrolysis coke and residues of any further carbon carries present, the above-described metals are finally oxidized and thermally utilized at temperatures below 1800° C. in the oxidation zone (7) along with the oxygen-containing gas (11) flowing in from below. As a result, it is possible for the countercurrent gasifier to be supplied with practically all the energy necessary for the gasification. This is also known as an autothermic gasification process.

In this oxidation, pyrolysis coke and any carbon carriers still present are oxidized practically completely, forming $CO_2$ and CO.

Metals, if they have a standard potential of less than 1 volt, are largely converted in the oxidation zone (7) into their oxides, while noble metals, which have a higher standard potential than 1 volt, in particular gold, are preserved in elemental form.

The moving bulk-material bed, together with the metals that are predominantly in oxide form and the metals that are present in elemental form, reaches the cooling zone (12).

Water (14) can also be metered into the cooling zone (12), as a further cooling and gasification medium, via water lances (15).

The synthesis gas formed in the vertical processing chamber is extracted by suction (16) at the upper end, so that in the upper gas chamber (17) of the vertical processing chamber, a slight underpressure of 0 to −200 bar is preferably established.

During the gasification process, depending on the quality of the materials used, considerably proportions of gaseous, acidic, halogen-containing gases, or halogens themselves, can occur. When electronic scrap is used, bromine-containing flame retardants that are contained in printed circuit boards, for instance, can lead to a considerable release of hydrogen bromide or elemental bromine. It is therefore advantageous if before the entry into the vertical processing chamber, alkaline substances (3) are admixed with the electronic scrap. Metal oxides, metal hydroxides or metal carbonates are especially suitable for this; the use of fine-granular calcium oxide is especially preferred, since because of its reactivity and large surface area, it reacts spontaneously with the gaseous halogen compounds or halogens formed and forms solid salts, which are discharged from the vertical processing chamber very predominantly, along with the extracted synthesis gas. Still other pollutants, such as chlorine, hydrogen chloride, or volatile heavy metals, can also be bound very effectively to the calcium oxide and discharged from the process in the same way.

Additionally, it can be appropriate also to add coarse-granular metal oxides, metal hydroxides or metal carbonates as the coarse material (4), in order on the one hand to increase the bulk material in proportion to the electronic scrap and on the other also to make alkaline reaction partners in the lower part of the vertical processing chamber available for binding the gaseous halogen compounds or halogens.

The extracted synthesis gas contains dust, which essentially comprises the solid salts of the halogens, fine-granular lkts, other pollutants, and inert particles. Depending on the course of the process and the composition of the electronic scrap, it is also possible that the dust also contains slight amounts of metals, noble metals and rare earth metals in oxidic or elemental form. This is true in particular if very fine-granular particles of these metals are entrained with the resultant synthesis gas before they can be reduced, or converted into molten particles, in the reduction zone (13). The synthesis gas containing dust can be treated in the gas chamber (17) of the vertical processing chamber, or after leaving the vertical processing chamber at (16), in the presence of water vapor and fine-granular calcium oxide at temperatures of over 400° C. This temperature can be adjusted by suitable adjustment of the quantity of oxygen-containing gas (11) at the lower end of the vertical processing chamber, or by mean of the heating output of the burner lances (6) in the oxidation zone (7). However, it is particularly advantageous to use direct firing into the synthesis gas via burner lances (18), which are fueled stoichiometrically with fuel and oxygen-containing gas or also with an excess of oxygen-containing gas. This thermal post-treatment in the presence of water vapor and calcium oxide guarantees that any oils and tars still present in slight quantities in the synthesis gas will be split off by the catalytic action of the calcium oxide.

The synthesis gas that contains dust is then freed of the dust, at temperatures above 300 248 C, via hot-gas filtration (19). The halogen-containing filter dust (20) is spun out of the process. In a preferred embodiment of the method, it is also possible for the filter dust, again at least partially in the form of fine-granular alkaline substances, with the bulk material at (3) and thereby effect a partial circulatory mode of moving the filter dust.

The resultant synthesis gas (10) is practically halogen-free and can be made available, in the form of raw material or fuel, for the most various uses.

Depending on local conditions or requirements in the further use of the synthesis gas, it may be necessary to cool the synthesis gas by means of gas coolers (21) and free it of condensates, before it can be utilized. The condensate (22) that occurs can be used at least partially again as a cooling and gasification medium via the water lances (15) in the vertical processing chamber.

The bulk material mixture (23) emerging at the lower end of the vertical processing chamber essentially contains coarse-granular bulk material, ash residues, and fine-granular calcium oxide, in which the oxides of the metals and especially the oxides of the rare earth metals and the noble metals that melt below 1500° C. are enriched.

The entire bulk material stream can be spun out of the process (24) for recovery of the metals, noble metals and rare earth metals. However, screening of the bulk material mixture (25) is especially preferred, in which the coarse fraction (26) is preferably at least partly put into circulation and can be re-used as a coarse material additive at (4) in the vertical processing chamber.

The fine screening fraction (B) contains residues of ash and fine-granular calcium oxide, in which the oxides of the metals and in particular the oxides of the rare earth metals and the noble metals that melt below 1500° C. and are present in elemental form are enriched.

In a preferred embodiment of the method, it is then possible for the fine screening fraction to be admixed, again in the form of fine-granular alkaline substances, with the bulk material at (3) and thereby to effect a partial circulatory mote of driving the fine screening fraction. This makes it possible to still further increase the concentration of the oxides of the metals and in particular the oxides of the rare earth metals and the noble metals that melt below 1500° C. and are present in elemental form. As a result, especially efficient recovery of these valuable substances from the fine screening fraction, using suitable physical and/or chemical methods, is made possible.

As already discussed above, the filter dust (20) may also contain significant amounts of metals, rare earth metals or noble metals. Therefore even the filter dust may possible be used for recovering these valuable substances, using suitable physical and/or chemical methods.

The invention claimed is:

1. A method for obtaining metals, noble metals and rare earth metals from scrap, characterized in that in a countercurrent gasifier having a moving bulk-material bed, which has a reduction zone and an oxidation zone, scrap and carbon-containing materials are oxidized with oxygen-containing gases in the presence of alkaline substances under overall reductive conditions at a total lambda of less than 1; resultant synthesis gas is drawn off at the top part of the countercurrent gasifier, and the metals, noble metals and rare earth metals are at least partially bound as oxides and/or in elemental form to the alkaline substances, whereupon they are obtained from the method as an enriched mixture by physical separation methods.

2. The method of claim 1, characterized in that the carbon-containing material and the scrap are electronic scrap and/or entire outdated electronic devices.

3. The method of claim 1, characterized in that cable residues and/or other metal-containing dusts or solids are added to the carbon-containing material and scrap, in order to further increase a proportion of usable metal in the bulk material.

4. The method of claim 3, characterized in that the metal-containing dusts or solids are ashes from combustion processes, oil shale or other naturally occurring carbon-containing substances that contain metal.

5. The method of claim 3, characterized in that metal oxides, metal carbonates and metal hydroxides contain elements of the alkali metals or elements of alkaline earth metals.

6. The method of claim 1, characterized in that as the alkaline substances, metal oxides, metal carbonates, and metal hydroxides or mixtures of two or three of these substances are used, and they are metered purposefully into the countercurrent gasifier, into a gas phase above a reduction zone, or admixed with the carbon-containing materials before entry into a vertical processing chamber.

7. The method of claim 6, characterized in that the water vapor is purposefully metered into the vertical processing chamber and/or into the gas phase above the reduction zone, and/or is furnished in situ from a residual moisture of the materials used.

8. The method of claim 1, characterized in that the alkaline substances are used at least partially in fine-granular form with a particle size of less than 2 mm as a solid and/or as a suspension in water.

9. The method of claim 1, characterized in that the moving bulk-material bed is formed partially by additional metering of coarse material in order to increase the flowability of the bulk material and/or its gas permeability, and the coarse material is admixed with the carbon-containing materials before entry into a vertical processing chamber.

10. The method of claim 9, characterized in that as a coarse material, mineral substances and/or other inorganic substances having a particle size of 2 mm to 300 mm are used.

11. The method of claim 9, characterized in that as the coarse material, wood and/or other biogenic materials having a particle size of 2 mm to 300 mm are used.

12. The method of claim 1, characterized in that an overall reductive conditions proceed at a total lambda of less than 0.7 over all stages of the processing chamber.

13. The method of claim 1, characterized in that before entry into a vertical processing chamber, additional carbon carriers are admixed with the carbon-containing materials, to increase the concentration of usable carbon-containing components in the moving bulk-material bed.

14. The method of claim 1, characterized in that the temperature in the reduction zone is up to 1500° C., so that the metals and rare earth metals, which are present in the form of oxides and as elements have a standard potential in an acid solution of less than 0 volts compared to the standard hydrogen electrode, are reduced at least partially into elemental metals by means of the carbon that is present and the carbon monoxide that is contained in a synthesis gas.

15. The method of claim 1, characterized in that reduced metals, rare earth metals and metals, noble metals or rare earth metals already present at an outset as elements in the carbon-containing materials at least partially reach their melting point in the reduction zone and are at least partially fixed as molten droplets on the moving bulk-material bed and are transported onward in the countercurrent gasifier into the oxidation zone.

16. The method of claim 14, characterized in that the mixture comprising fine-granular mineral substances, metals and rare earth metals in oxide form, and noble metals in elemental form which is discharged at the lower end of the countercurrent gasifier together with the moving bulk-material bed is separated, as a mixture of fine material from the coarse-particulate bulk material, by screening.

17. The method of claim 15, characterized in that the mixture comprising fine-granular mineral substances, metals and rare earth metals in oxide form, and noble metals in elemental form which is discharged via a synthesis gas at the upper end of the countercurrent gasifier is carried together with the synthesis gas via a physical solids separator and separated out as filter dust.

18. The method of claim 1, characterized in that metals reduced in the reduction zone and the metals, noble metals or rare earth metals already present in elemental form at an outset of the process, if they have normal potentials in an acid solution of less than 1 volt compared to the standard hydrogen electrode, are converted at least partially into oxides in the oxidation zone at temperatures of up to 1800° C. and at a lambda of greater than 1, which are enriched in the proportion of fine-granular mineral substances, and as a result a mixture of fine-granular alkaline substances, metals and rare earth metals in oxide form, and noble metals in elemental form, is generated.

19. The method of claim 18, characterized in that the fine material mixture and/or the filter dust is partially returned to the moving bulk-material bed at, and as a result of this partial recirculation, a further enrichment of the metals and rare earth metals in oxide form and noble metals in elemental form is achieved.

20. The method of claim 1, characterized in that the mixture comprising fine-granular alkaline substances, metals and rare earth metals in oxide form, and noble metals in elemental form is partially discharged with the moving bulk-material bed at the lower end of the countercurrent gasifier and partly discharged via a synthesis gas from the upper end of the countercurrent gasifier.

21. The method of claim 1, characterized in that all the carbon-containing materials introduced into the method and the carbon carriers purposefully metered in are adjusted in their total metered quantity in the moving bulk-material bed such that sufficient carbon, for the reduction reactions in the reduction zone as well as sufficiently oxidizable carbon in the oxidation zone for the energy input into the countercurrent gasifier, is present.

22. The method of claim 1, characterized in that all the oxygen-containing gases introduced into the method are adjusted in their total metered quantity such that sufficient oxygen for complete oxidation of the pyrolysis coke residues present in the oxidation zone and as applicable, residues of further carbon carriers and oxidizable metals, rare earth metals and noble metals in elemental form, are available.

23. The method of claim 1, characterized in that in a vertical processing chamber and/or in a gas phase of the gaseous reaction products are drawn off at temperatures of more than 400° C. and in the presence of water vapor and calcium oxide and/or calcium carbonate and/or calcium hydroxide, a calcium-catalyzed reformation of substantial proportions of a resultant of the oil- and/or tar-containing cleavage products, which have a chain length of greater than C4, into carbon monoxide, carbon dioxide and hydrogen.

* * * * *